July 7, 1970      J. B. RINCKHOFF      3,519,388
PRODUCTION OF SULFURIC ACID
Filed Oct. 16, 1967
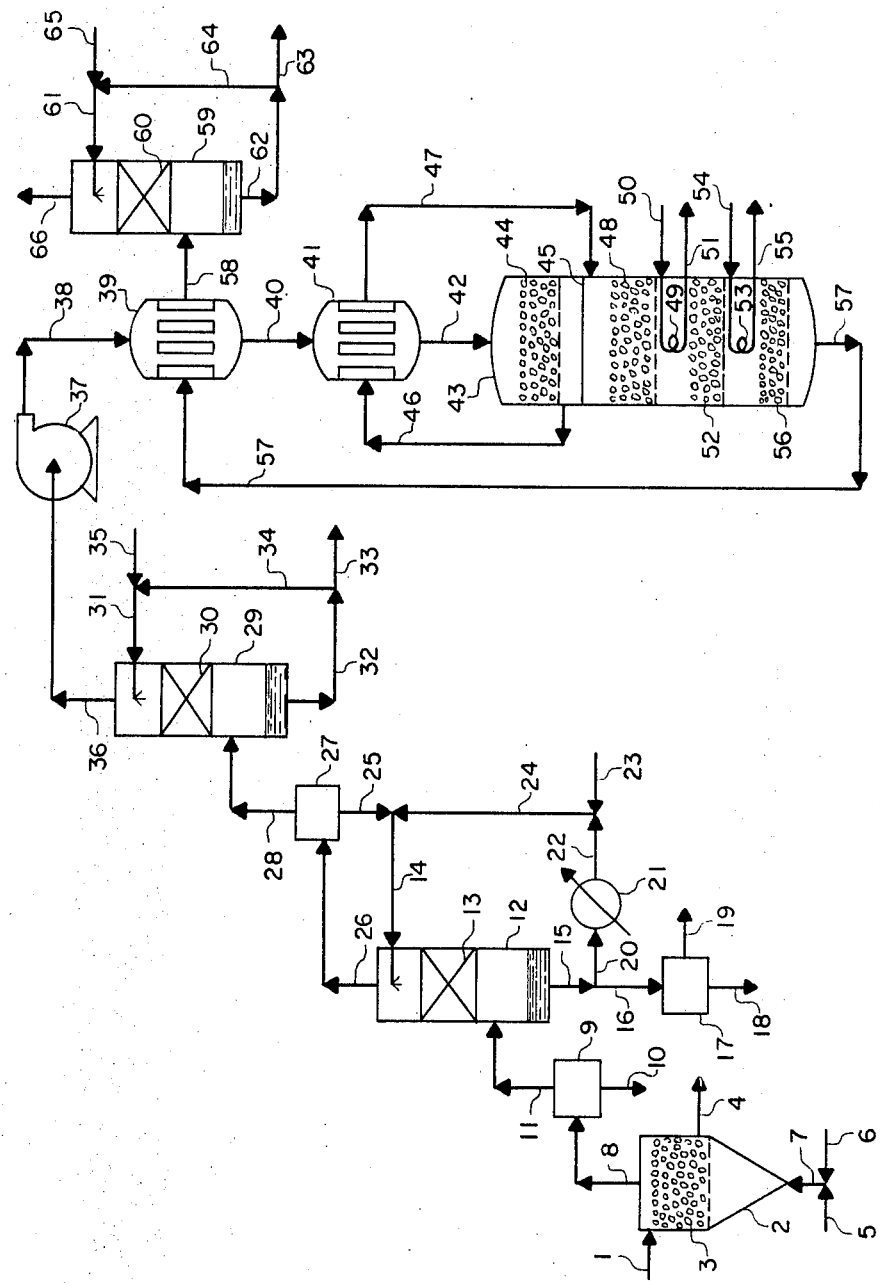
JOHN B. RINCKHOFF
INVENTOR.
BY *J. T. Chaboty*
AGENT

# United States Patent Office 3,519,388
Patented July 7, 1970

3,519,388
PRODUCTION OF SULFURIC ACID
John B. Rinckhoff, Westfield, N.J., assignor to Chemical Construction Corporation, New York, N.Y., a corporation of Delaware
Filed Oct. 16, 1967, Ser. No. 675,369
Int. Cl. C01b 17/74, 17/48
U.S. Cl. 23—167          14 Claims

ABSTRACT OF THE DISCLOSURE

A hot sulfur dioxide-containing gas stream, typically derived from a pyrites ore smelter or copper converter at a temperature above 100° C. and containing less than about 8% by volume of sulfur dioxide together with excess free oxygen and water vapor in an amount not more than that required for product acid, is employed as a sulfur source for the production of concentrated sulfuric acid. In order to prevent the introduction of excess water into the acid system, the hot gas stream is initially cooled by contact with a liquid stream of sulfuric acid solution containing about 60% to 80% sulfuric acid content by weight, which is at an initial temperature in the range of about 50° C. to 85° C. The sulfuric acid solution strength and initial temperature are selected so that the solution has a partial pressure of water vapor which is substantially equal to the partial pressure of water vapor in the gas stream, and the gas stream is cooled to a temperature in the range of about 50° C. to 100° C. by contact with the liquid sulfuric acid stream, without changing the water vapor content of the gas stream. The heated acid solution is externally cooled and recycled. The cooled gas stream is subsequently processed to remove entrained liquid acid droplets and mist, scrubbed with concentrated sulfuric acid typically of 93% concentration to remove water vapor, heated to a temperature in the range of 400° C. to 600° C., catalytically reacted to convert sulfur dioxide to sulfur trioxide, cooled, and scrubbed with concentrated sulfuric acid typically of 98% concentration to absorb sulfur trioxide and form further sulfuric acid in solution.

BACKGROUND OF THE INVENTION

Field of the invention

The invention relates to the processing of hot dilute sulfur dioxide-containing gas streams, such as are produced by copper ore smelters or converters, pyrites roasters or the processing of ferrous sulfate, in order to cool the gas stream prior to usage in sulfuric acid manufacture, without adding water vapor to the gas stream during the cooling step.

Description of the prior art

The conventional procedure for cooling the hot sulfur dioxide-containing gas stream, prior to such procedural steps as electrostatic precipitation of residual entrained dust particles and liquid droplets followed by scrubbing with 93% sulfuric acid for removal of water vapor, entails the spraying of liquid water into the hot gas stream, so that the gas stream is cooled by transfer of heat to the liquid phase and also by evaporation of water into the gaseous phase. It will be evident that this prior art procedural step serves to saturate the gas stream with water vapor, and thus the water vapor must subsequently be removed by cooling the gas stream sufficiently to condense excess water vapor as liquid water, and thereby reduce the water vapor content of the gas stream to that required for the product acid. In instances when the gas stream initially contains a relatively high proportion of sulfur dioxide, this prior art procedure does not upset the water balance of the sulfuric acid circuit, since the amount of water vapor absorbed in the 93% acid does not upset the water balance, relative to the total acid production, and thus the absorbed water vapor does not produce excessive dilution of the system. However, in instances when the gas stream initially contains a low concentration of sulfur dioxide, it becomes necessary to cool the saturated gas stream discharged from water scrubbing to a very low temperature in order to reduce residual water vapor content to a level which will not upset the water balance of the acid circuit. For example, if the initial gas stream contains 3% sulfur dioxide content, and the desired product is 93% sulfuric acid, then the scrubbed gas must be cooled to 29° C. If the product is 98% acid, the gas must be cooled to 22° C. In most instances, cooling water is only available at a minimum temperature of 30° C., and thus in the prior art designs, auxiliary cooling must be provided.

Procedures of this prior art water scrubbing technique are described in U.S. Pat. Nos. 2,341,887; 1,545,142; 2,238,012; 2,389,070 and 2,406,930. In addition, the use of dilute sulfuric acid for this purpose, with concomitant addition of water vapor to the gas streams, is described in U.S. Pat. Nos. 1,943,137 and 2,357,195.

SUMMARY OF THE INVENTION

In the present invention, a hot gas stream containing a relatively low proportion of less than about 8% by volume of sulfur dioxide content, such as the off-gas from a copper ore smelter or converter, pyrites roaster or the like, is employed as a sulfur source in sulfuric acid manufacture. The hot gas stream, which is generally produced at a temperature above 100° C. is initially cooled to a temperature usually in the range of about 50° C. to 100° C., prior to further processing in the sulfuric acid process which includes separation of entrained liquid droplets and mist, scrubbing with 93% sulfuric acid for water vapor removal, catalytic conversion of sulfur dioxide to sulfur trioxide, and scrubbing of the gas stream with 98% sulfuric acid to absorb sulfur trioxide and form further sulfuric acid. The initial cooling of the hot gas stream is accomplished according to the present invention by contacting the hot gas stream with a liquid stream of sulfuric acid solution which contains in the range of about 60% to 80% sulfuric acid content by weight and is at an initial temperature of about 50° C. to 85° C. By selecting a sulfuric acid solution having a strength and temperature within these ranges, the sulfuric acid solution has a partial pressure of water vapor which is substantially equal to the partial pressure of water vapor in the gas stream. The gas stream is therefore cooled to a temperature generally in the range of about 50° C. to 100° C. by contact with the liquid stream of sulfuric acid, without substantially changing the water vapor content of the gas stream. The cooled gas stream is then subjected to further processing in the sulfuric acid process as described supra, and the warmed sulfuric acid solution is externally cooled and recycled.

A principal advantage of the invention is that the hot gas stream is effectively and efficiently cooled to a lower temperature, without the addition of water vapor to the gas stream. This important result serves to preserve the water balance of the sulfuric acid circuit in the subsequent processing of the gas stream, since the gas is subsequently scrubbed with 93% sulfuric acid to remove water vapor prior to catalysis. Thus, if the gas stream was cooled in accordance with prior art practice of spraying liquid water into the gas stream, followed by cooling to condense liquid water, the gas stream would become saturated with water vapor and a large proportion of water vapor relative to sulfur dioxide would be present in the gas stream. This large proportion of water vapor would be absorbed in the 93% sulfuric acid, producing excessive dilution of the acid and serving to upset the water balance of the acid circuit. Another advantage of the invention is that the small proportion of sulfur trioxide which is usually present in the gas streams from smelters, roasters and the like, is absorbed in the 60%–80% sulfuric acid solution to form further sulfuric acid in situ, which reduces the amount of very dilute sulfuric acid produced in the electrostatic precipitators. A further advantage is that the gas cooling step produces a scrubbing action which removes most of the entrained dust particles from the gas stream.

It is an object of the present invention to provide an improved process for the production of sulfuric acid.

Another object is to provide a sulfuric acid process which produces concentrated acid from hot gas streams containing less than 8% sulfur dioxide content.

A further object is to produce concentrated sulfuric acid from hot dilute sulfur dioxide-containing gas streams without upsetting the water balance of the sulfuric acid circuit.

An additional object is to cool a hot gas stream containing a small proportion of sulfur dioxide without adding water vapor to the gas stream.

Still another object is to cool a hot sulfur dioxide-containing gas stream by contact with a cold sulfuric acid solution which has a partial pressure of water vapor which is substantially equal to the partial pressure of water vapor in the gas stream, so that the gas stream is cooled by the liquid sulfuric acid solution without substantially changing the water vapor content of the gas stream.

These and other objects and advantages of the present invention will become evident from the description which follows.

DESCRIPTION OF THE DRAWING AND PREFERRED EMBODIMENTS

Referring to the drawing, a flowsheet of a preferred embodiment of the invention is presented. A process feed stream 1, consisting of a sulfur-containing material such as copper ore, iron pyrites, or other metallic or sulfide ore, or other sulfur-containing material such as copper converter matte or ferrous sulfate, is passed into roaster or smelter 2, which is typically a fluid bed roaster, Stream 1 is added to fluid bed 3, which is generally maintained at high temperature oxidizing conditions to produce oxidation of the stream 1 and formation of sulfur dioxide, which joins the gas phase. Details of typical operating conditions for unit 2 are described in U.S. Pat. No. 3,059,995. The resulting oxidized solids component from bed 3 is removed via stream 4, which is of reduced sulfur content. Bed 3 is maintained at an elevated temperature, generally above about 200° C. and typically in the range of about 220° C. to 350° C., by passing process air stream 5 together with fluid hydrocarbon fuel stream 6 into unit 2 below bed 3 via stream 7. The combustion of stream 6 in unit 2 serves to generate a high temperature oxidizing gas which permeates upwards through bed 3 and removes sulfur from the solids component as sulfur dioxide. In some instances, such as when stream 1 is of high sulfur content and the roasting reaction is thermally self-sustaining, the flow of stream 6 may be intermittently reduced or terminated.

The resultant hot gas stream 8 generated in unit 2 is removed at an elevated temperature generally above 100° C. and typically in the range of about 220° C. to 350° C. Stream 8 contains sulfur dioxide in a proportion less than about 8% by volume, and generally in the range of about 1% to 6% content by volume. In addition, stream 8 may contain water vapor derived from auxiliary processing such as a partial quench. The process air stream 5 also adds a water vapor component to stream 8, and in some cases stream 1 contains water which is evaporated in bed 3 and joins the gas phase. In most instances, stream 8 contains in the range of about 0.2% to 6% water vapor content by volume. Stream 8 also contains excess free oxygen and inerts such as nitrogen, which are derived from stream 5, and finally stream 8 contains solid dust particles entrained from bed 3.

Stream 8 is initially processed in unit 9 to remove most of the entrained solid dust particles. Unit 9 may consist of an electrostatic precipitator, bag filter or other means for removal of an entrained solids component from a gas stream. The separated dust is removed from unit 9 via stream 10, which is usually added to stream 4. The resulting gas stream 11 discharged from unit 9 now contains only a very minor proportion of entrained solids particles, and stream 11 is now cooled in accordance with the present invention, without adding water vapor to the gas stream.

Stream 11 is passed into cooling tower 12 below gas-liquid contact section 13, which may consist of a bed of spherical or ring packing, sieve trays or bubble cap plates, or other means for contact between a liquid and a gas stream. Liquid sulfuric acid stream 14 is passed into tower 12 above section 13, and flows downwards through section 13 to cool the rising gas phase. Stream 14 consists of aqueous sulfuric acid solution containing in the range of about 60% to 80% sulfuric acid content by weight, and is at an initial temperature in the range of about 50° C. to 85° C. Within these ranges of concentration and temperature, the sulfuric acid solution has a partial pressure of water vapor which is substantially equal to the partial pressure of water vapor in the gas stream, and the rising gas stream is cooled in section 13 by contact with the liquid sulfuric acid, without substantially changing the water vapor content of the gas stream.

The resulting warmed sulfuric acid solution is removed from the bottom of unit 12 via stream 15, which is generally at a temperature in the range of about 70° C. to 110° C. Since the contact of the liquid phase in section 13 with the rising gas stream produces a gas scrubbing action as well as a cooling effect, stream 15 contains a small proportion of entrained solid particles. A portion of stream 15 is withdrawn as stream 16, which is processed in filter unit 17 for solids removal. The separated solids particles stream 18 is passed to external disposal, and may be added to stream 4. Clear sulfuric acid solution stream 19 may be passed to other utilization, or may be recycled to the process, as will appear infra.

The major portion of stream 15 is cooled and recycled via stream 20 for further gas cooling. Stream 20 is cooled in heat exchanger 21 to a temperature in the range of 50° C. to 85° C., and discharged from uint 21 via stream 22. Makeup sulfuric acid stream 23 may be added to stream 22, to compensate for the withdrawal of stream 16. Stream 23 may contain in the range of about 60% to 80% sulfuric acid content by weight, however in some instances stream 23 will be more concentrated and may contain over 90% sulfuric acid content by weight, in order to compensate for gradual dilution of the re-circulating stream 22 due to a minor amount of water vapor absorption from the gas stream which may take place in section 13. The resulting combined acid stream 24 is now preferably combined with a sulfuric acid stream 25, derived in a manner to be described infra, and the total combined sulfuric acid stream is recycled to unit 12 above section 13 as stream 14.

The resulting cooled gas stream 26 discharged from unit 12 above section 13 is now at a temperature generally in the range of about 50° C. to 100° C., and stream 26 has a water vapor content substantially equal to the water vapor content of the initial gas stream 11 as passed into unit 12. Stream 26 usually contains entrained liquid sulfuric acid droplets and mist, which are removed by passing stream 26 into entrainment separator 27, which may consist of an electrostatic mist precipitator or a baffled or cyclonic unit such as the device described in U.S. Pat. No. 2,998,100. The separated liquid mist and droplets are removed from unit 27 as liquid sulfuric acid stream 25, which is preferably combined with stream 24 to form stream 14 as described supra. In other instances, stream 25 may be passed to external utilization or combined with other sulfuric acid process streams, as will appear infra. The gaseous process stream 28 discharged from unit 27 is now substantially free of entrained liquid acid droplets and mist, however stream 28 contains water vapor which must be removed prior to the catalytic oxidation of sulfur dioxide in the gas stream to sulfur trioxide, in order to prevent the formation of a sulfuric acid mist.

Stream 28 is passed into drying tower 29 below gas-liquid contact section 30, which is generally similar in configuration to section 13 described supra. A drying acid stream 31 is passed into tower 29 above section 30, and flows downwards through section 30 countercurrent to the rising gas stream. Stream 31 consists of concentrated sulfuric acid solution containing at least 90% sulfuric acid content by weight and generally in the range of about 93% to 95% sulfuric acid content. The downflowing concentrated acid absorbs water vapor from the gas stream in section 30, and the resulting acid solution, now containing absorbed water vapor and therefore slightly diluted, is removed from the bottom of unit 29 via stream 32. A portion of stream 32 may now be withdrawn via stream 33 as a product of the process. The balance of stream 32 is recycled via stream 34, which may be cooled by heat exchanger means not shown. Stream 34 is combined with concentrated sulfuric acid stream 35 which has an acid strength above 95% by weight, in order to compensate for dilution of the acid which takes place due to water vapor absorption in unit 29. The combined acid stream 31, now of proper acid strength for water vapor absorption, is recycled as described supra.

The resulting process gas stream 36 discharged from unit 29 above section 30 is now substantially free of water vapor, and contains sulfur dioxide, excess free oxygen and inerts such as nitrogen. Stream 36 is now of suitable composition for catalytic conversion of sulfur dioxide to sulfur trioxide, however stream 36 must be initially heated to a suitable ignition temperature in the range of 400° C. to 600° C. in order to initiate the catalytic oxidation reaction. Stream 36 is passed through process gas blower 37, which provides motive power for gas circulation through the system. The process gas stream 38 discharged from blower 37 passes through heat exchanger 39, and is heated by heat exchange with fully converted gas. The resulting heated process gas stream 40 discharged from unit 39 is passed through heat exchanger 41, in which the process gas stream is further heated to a catalytic reaction temperature in the range of 400° C. to 600° C. by heat exchange with a partially converted process gas stream. The resulting fully heated process gas stream 42 discharged from unit 41 is now at a suitable temperature in the range of 400° C. to 600° C., and is now passed to catalytic conversion means for oxidation of sulfur dioxide to sulfur trioxide.

Stream 42 is now passed into multi-stage catalytic converter 43, which is provided with a plurality of beds consisting of a suitable catalyst for the catalytic oxidation of sulfur dioxide to sulfur trioxide, such as platinum, vanadium or vanadium oxide, deposited on a suitable carrier. The process gas stream initially passes through the upper catalyst bed 44, in which a portion of the sulfur dioxide is catalytically oxidized to sulfur trioxide. In most instances, a major portion of the sulfur dioxide is oxidized to sulfur trioxide in bed 44. The oxidation reaction is exothermic, and the process gas stream must be cooled between catalyst bed stages in order to prevent excessive temperature rise and overheating of the catalyst beds, which could result in catalyst deterioration and loss of activity. The hot process gas stream discharged downwards from bed 44 is diverted by partition 45 to external heat exchange for cooling purposes. The hot process gas stream is removed from unit 43 below bed 44 and above partition 45 as gas stream 46, which passes to heat exchanger 41 and is cooled by heat exchange with unconverted process gas as described supra. The cooled partially converted process gas stream 47 discharged from unit 41 now passes into unit 43 below partition 45, and flows downwards through catalyst bed 48, in which further catalytic oxidation of sulfur dioxide to sulfur trioxide takes place. The resulting heated process gas stream discharged below bed 48 is cooled by contact with cooling coil 49, through which a cooling fluid stream 50 usually consisting of ambient air is circulated. Heated fluid is discharged from coil 49 via stream 51. The cooled process gas stream next flows through catalyst bed 52 for further catalytic oxidation of a portion of the residual sulfur dioxide in the gas stream. The heated process gas stream is cooled below bed 52 by contact with coil 53, through which cooling fluid stream 54 is circulated, with removal of warmed fluid from coil 53 via stream 55. The cooled process gas stream now passes through the lowest catalyst bed 56, for final catalytic conversion of substantially all of the residual sulfur dioxide in the gas stream to sulfur trioxide. A fully converted hot process gas stream 57, now substantially free of sulfur dioxide and principally containing sulfur trioxide, residual free oxygen and inerts, is discharged from unit 43 below bed 56.

Stream 57 will usually be cooled prior to the absorption of sulfur trioxide in concentrated liquid sulfuric acid. Stream 57 is preferably passed to heat exchanger 39, and is cooled in unit 39 by heat exchange with cold incoming unconverted process gas as described supra. The resulting cooled converted gas stream 58 discharged from unit 39 is now at a reduced temperature typically in the range of about 130° C. to 250° C. Stream 58 is passed into gas scrubbing tower 59 below gas-liquid contact section 60, which is usually of a configuration similar to section 13 described supra. The gas stream rises through section 60 countercurrent to scrubbing liquid consisting of concentrated sulfuric acid, which is admitted into unit 59 above section 60 via stream 61. The stream 61 consists of sulfuric acid solution which typically contains over 95% sulfuric acid content by weight, and in most instances stream 61 will contain at least 98% sulfuric acid content. Stream 61 flows downwards through seciton 60 and absorbs substantially all of the sulfur trioxide from the rising gas phase, with the concomitant formation of further sulfuric acid in solution. The resultant liquid sulfuric acid solution of increased acid strength collects in the bottom of unit 59, and is withdrawn as stream 62. A portion of stream 62 may be discharged from the system as product strong acid stream 63, which will usually consist of about 98% sulfuric acid. The balance of stream 62 consisting of stream 64 is cooled by heat exchanger means, not shown, and is then combined with make-up stream 65 which consists of water or sulfuric acid solution of a strength less than 95%, which may be derived from other process acid streams described supra. The resultant stream 61 produced by combination of streams 64 and 65 is recycled as described supra. The residual gas stream 66 removed from unit 59 above section 60 now consists mainly of residual free oxygen and inerts such as nitrogen, and may be passed through a mist filter pad or entrainment separator for the recovery of acid droplets. However, in most instances of normal operation, stream 66 will only contain a negligible proportion of acid mist or droplets and residual sulfur oxides, and may be safely discharged directly to the atmosphere.

Numerous alternatives within the scope of the present invention, besides those mentioned supra, will occur to those skilled in the art. The ranges of process variables enumerated supra, such as acid solution concentrations and temperatures of process streams, represent merely preferred embodiments of the inventive concept for optimum utilization of the process, and the invention may be utilized outside of these ranges in practice, except that the invention will usually be applied to instances where the initial process gas stream contains less than about 8% sulfur dioxide content and is at a temperature above 100° C. It is also a process prerequisite that the liquid sulfuric acid employed to cool the hot gas stream should contain in the range of about 60% to 80% sulfuric acid content, and should be at an initial temperature in the range of about 50° C. to 85° C., in order to provide a sulfuric acid solution which has a partial pressure of water vapor which is substantially equal to the partial pressure of water vapor in the gas stream being cooled.

Stream 19 may be further utilized in the process as a component of stream 65, and a portion or all of stream 33 may also be further utilized as a component of stream 65 or stream 23. In instances when all of stream 33 is added to stream 64 via stream 65, the stream 63 consisting of highly concentrated sulfuric acid, typically of 98% acid strength, will be the product of the process. Alternatively, stream 63 may be partially or totally employed as a component of stream 35, and in instances when all of stream 63 is recycled via stream 35, the stream 33 consisting of concentrated sulfuric acid, typically of 93% acid strength, will be the product of the process. A portion of stream 63 may also be employed as stream 23.

Although unit 43 has been shown and described as containing four catalyst beds in series, in some instances more or less than four beds may be provided in practice, however the reaction is preferably carried out employing at least three beds in series, in order to moderate temperature rise due to the exothermic nature of the reaction and to provide adequate interbed cooling of the process gas stream. The fully converted hot process gas stream 57, which is produced at a temperature generally in the range of 430° to 500° C., may be initially passed through a waste heat steam boiler, in instances when process steam is needed for other processes associated with the sulfuric acid facility. In addition, stream 46 may also be passed through a waste heat steam boiler. In such instances, either or both of units 39 and 41 may be omitted, with stream 38 being heated to form stream 42 by heat exchange with other process streams or hot flue gas generated by the combustion of a fluid hydrocarbon.

An example of an industrial application of the process of the present invention will now be described.

EXAMPLE

The process of the present invention was applied to the design of a plant for the production of 300 tons per 24 hour day of sulfuric acid as 93% solution from copper converter gas containing an average of 3.6% sulfur dioxide and 3.2% water vapor at a temperature of 260° to 290° C. Following are the temperatures and concentrations of principal process streams under normal operating conditions.

| Stream No.: | Temp. ° C. | Content or concentration |
| --- | --- | --- |
| 11 | 275 | 3.6% sulfur dioxide. 3.2% water vapor. |
| 14 | 74 | 75% sulfuric acid. |
| 15 | 91 | Do. |
| 26 | 80 | 3.6% sulfur dioxide. 3.2% water vapor. |
| 31 | 35 | 93% sulfuric acid. |
| 32 | 55 | Do. |
| 36 | 65 | 3.6% sulfur dioxide. |
| 42 | 435 | Do. |
| 46 | 515 | 1.1% sulfur dioxide. 2.6% sulfur trioxide. |
| 57 | 445 | 3.7% sulfur trioxide. |
| 58 | 170 | Do. |
| 61 | 76 | 98% sulfuric acid. |

I claim:

1. A process for the production of sulfuric acid from a hot gas stream containing sulfur dioxide, water vapor and excess free oxygen, said hot gas stream containing less than about 8% by volume of sulfur dioxide and being at a temperature above 100° C., which comprises contacting said hot gas stream with a liquid stream of sulfuric acid solution, said liquid sulfuric acid solution containing in the range of about 60% to 80% sulfuric acid content by weight and being at an initial temperature in the range of about 50° C. to 85° C., whereby said sulfuric acid solution has a partial pressure of water vapor which is substantially equal to the partial pressure of water vapor in said gas stream, and whereby said gas stream is cooled by contact with said liquid stream, without substantially changing the water vapor content of said gas stream, separating the resulting warmed liquid sulfuric acid solution from the cooled gas stream, cooling said warmed liquid sulfuric acid solution to a temperature in the range of about 50° C. to 85°C., recycling the cooled liquid sulfuric acid solution for further contact with hot gas, separating entrained acid droplets and mist from the cooled gas stream to form a separated liquid sulfuric acid stream, scrubbing the cooled gas stream with concentrated sulfuric acid solution containing at least 90% sulfuric acid content by weight, whereby water vapor is absorbed from the cooled gas stream into said concentrated sulfuric acid solution, heating said gas stream to a temperature in the range of 400° C. to 600° C., catalytically converting the sulfur dioxide content of said heated gas stream to sulfur trioxide, and scrubbing the resulting sulfur trioxide-containing gas stream with concentrated liquid sulfuric acid solution to absorb sulfur trioxide and form further sulfuric acid.

2. The process of claim 1, in which said separated liquid sulfuric acid stream, formed by separating entrained acid droplets and mist from the cooled gas stream, is added to said liquid sulfuric acid solution containing in the range of about 60% to 80% sulfuric acid content by weight which is employed to contact and cool the initial hot gas stream.

3. The process of claim 1, in which said initial hot gas stream contains sulfur dioxide in the range of about 1% to 6% content by volume and water vapor in the range of about 0.2% to 6% content by volume, and is at an initial temperature in the range of about 220° C. to 350° C.

4. The process of claim 1, in which said initial hot gas stream is derived from the high temperature processing of a metallic sulfide.

5. The process of claim 4, in which said metallic sulfide is a sulfide ore.

6. The process of claim 1, in which entrained acid droplets and mist are separated from the cooled gas stream by electrostatic precipitation.

7. The process of claim 1, in which said gas stream is cooled to a temperature in the range of about 50° C. to 100° C., and said resulting liquid sulfuric acid solution is warmed to a temperature in the range of about 70° C. to 110° C., by said contact of the initial hot gas stream with said liquid stream of sulfuric acid solution containing in the range of about 60% to 80% sulfuric acid content by weight.

8. A process for the production of sulfuric acid from a hot gas stream containing sulfur dioxide, water vapor and free oxygen, said gas stream being at an initial temperature in the range of about 220° C. to 350° C. and containing less than about 8% by volume of sulfur dioxide, which comprises contacting said hot gas stream with a liquid stream of sulfuric acid solution, said liquid sulfuric acid solution containing in the range of about 60% to 80% sulfuric acid content by weight and being at an initial temperature in the range of about 50° to 85° C., whereby said sulfuric acid solution has a partial pressure of water vapor which is substantially equal to the partial pressure of water vapor in said gas stream, and whereby said gas stream is cooled to a temperature in the range of about 50° C. to 100° C. by contact with said liquid stream, without substantially changing the water vapor content of said gas stream, separating the resulting liquid sulfuric acid solution warmed to a temperature in the range of about 70° C. to 110° C. from the cooled gas stream, cooling said warmed liquid sulfuric acid solution to a temperature in the range of about 50° C. to 85° C., recycling the cooled liquid sulfuric acid solution for further contact with hot gas, separating entrained acid droplets and mist from the cooled gas stream to form a separated liquid sulfuric acid stream, scrubbing the cooled gas stream with concentrated sulfuric acid solution containing in the range of about 93% to 95% sulfuric acid content by weight, whereby water vapor is absorbed from the cooled gas stream into said concentrated sulfuric acid solution, heating said gas stream to a temperature in the range of 400° C. to 600° C., catalytically converting the sulfur dioxide content of said heated gas stream to sulfur trioxide, cooling the resulting hot sulfur trioxide-containing gas stream to a temperature in the range of about 130° C. to 250° C., and scrubbing the cooled sulfur trioxide-containing gas stream with concentrated liquid sulfuric acid solution to absorb sulfur trioxide and form further sulfuric acid.

9. The process of claim 8, in which said separated liquid sulfuric acid stream, formed by separating entrained acid droplets and mist from the cooled gas stream, is added to said liquid sulfuric acid solution containing in the range of about 60% to 80% sulfuric acid content by weight which is employed to contact and cool the initial hot gas stream.

10. The process of claim 8, in which said initial hot gas stream contains sulfur dioxide in the range of about 1% to 6% content by volume and water vapor in the range of about 0.2% to 6% content by volume.

11. The process of claim 8, in which said initial hot gas stream is derived from the high temperature processing of a metallic sulfide.

12. The process of claim 11, in which said metallic sulfide is a sulfide ore.

13. The process of claim 8, in which entrained acid droplets and mist are separated from the cooled gas stream by electrostatic precipitation.

14. The process of claim 8, in which said sulfur dioxide-containing gas stream is heated to a temperature in the range of 400° C. to 600° C. by heat exchange with said resulting hot sulfur trioxide-containing gas stream, whereby said sulfur trioxide-containing gas stream is cooled.

References Cited

UNITED STATES PATENTS 3,147,074  9/1964  Maurer _____ 23—168
1,943,137  1/1934  Mullen _____ 23—176

FOREIGN PATENTS 745,052  12/1955  England.

OTHER REFERENCES

The Manufacture of Sulfuric Acid, edited by Duecker & West (1959, published by Reinhold), pp. 218–219, 223, 231.

OSCAR R. VERTIZ, Primary Examiner

C. B. RODMAN, Assistant Examiner

U.S. Cl. X.R.
23—177